United States Patent

[11] 3,625,427

[72] Inventors Ravindra Nadkarni
  Cambridge;
  Frank J. Tremblay, Dracut; Charles L. Kusik, Winchester, all of Mass.
[21] Appl. No. 13,904
[22] Filed Feb. 25, 1970
[45] Patented Dec. 7, 1971
[73] Assignee Arthur D. Little, Inc.
  Cambridge, Mass.

[54] LIQUID FEED SYSTEM FOR FLUIDIZED BEDS
  3 Claims, 1 Drawing Fig.
[52] U.S. Cl. .................................................. 239/124,
  239/132.3, 239/208, 239/271, 239/600
[51] Int. Cl. .................................................. B05b 9/00
[50] Field of Search ........................................... 239/271,
  600, 601, 525, 208, 132.3, 132.5, 124

[56] References Cited
  UNITED STATES PATENTS
| 488,624 | 12/1892 | Brewster | 239/208 X |
| 1,106,679 | 8/1914 | Randall | 239/271 |
| 3,436,068 | 4/1969 | Beals et al. | 239/208 X |

Primary Examiner—Lloyd L. King
Attorney—Bessie A. Lepper

ABSTRACT: Apparatus for feeding liquid solutions by means of a nozzle into a fluidized bed used for evaporating liquids from solids in solution. The nozzle is coupled to a feed line outside the bed and a casing is provided to catch any fluid leaking from the coupling, thus preventing any fluid from leaking into the fluidized bed thereby helping to insure controlled chemical and physical properties in the solid particles thus produced.

PATENTED DEC 7 1971 3,625,427
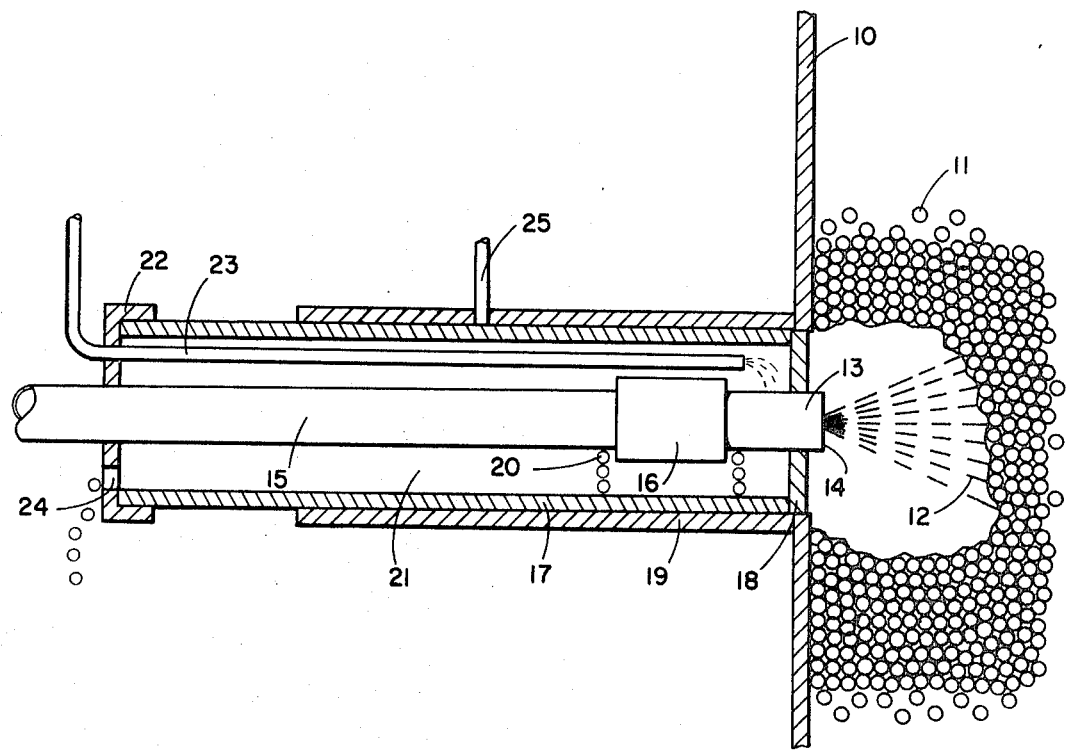
RAVINDRA NADKARNI
FRANK J. TREMBLAY
CHARLES L. KUSIK
*INVENTORS*
BY *Bruce A. Lepper*
Attorney

LIQUID FEED SYSTEM FOR FLUIDIZED BEDS

The invention herein described was made in the course of or under a contract with The adapted States Army. leakage, This invention relates to a liquid feed system and more particularly to a system suitable for introducing a liquid feed consisting of solids in solution into a gas-fluidized bed.

Liquid feed material to be processed in a fluidized bed is introduced as a fine spray onto the bed particles under the bed surface. This is commonly accomplished by pumping the liquid through a line coupled to an inlet line which terminates in a hydraulic nozzle, the delivery end of which is positioned to extend a small distance into the bed. Under the high temperature operating conditions experienced in this line and coupling, the liquid tends to leak out around the coupling. The large feed droplets can enter into the fluidized bed column resulting in an unwanted solid growth.

By the apparatus of this invention the leaking of the coupling is controlled and the resulting leaking of feed solution into the fluid bed is eliminated by placing a nozzle casing around the nozzle and the feed lines to draw off the liquid which leaks from the coupling.

It is therefore a primary object of this invention to provide an improved apparatus for introducing a liquid feed of solids in solution into a fluidized bed. It is another object to provide apparatus of the character described which prevents unwanted solid growth in the bed and which makes possible the delivery of uniformly sized liquid feed particles to the bed, to produce a bed product of uniform, controlled physical and chemical properties. It is an additional object of this invention to provide improved apparatus particularly suitable for forming composite materials by the method of U.S. Pat. No. 3,305,349. Other objects of the invention will in part be obvious and will in part be apparent hereinafter.

The invention accordingly comprises the feature of construction, combination of elements and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a cross section of a fragmentary part of a fluidized bed system showing the liquid feed system of this invention.

In the drawing the portion of a fluidized bed column wall 10 at the point of fluid feed delivery is shown. Inasmuch as fluidized beds are well-known in the art (see for example "Fluidization" by Max Leva, McGraw-Hill Book Company, Inc., New york (1959) and "Fluidization and Fluid-Particle Systems" by F. A. Zenz and D. F. Othner, Reinhold Publishing Corporation, New York (1960) it will not be necessary to describe that part of the apparatus which is not related to the invention. Within the bed column 10 are fluidized particles 11 which completely fill the bed up to a predetermined level. The drawing is shown with some of these particles removed to permit better illustration of the liquid feed spray 12 which is caused to impinge under pressure onto the hot particle surfaces. The spray 12 is delivered by a nozzle 13, the delivery surface 14 of which may be essentially flush with the inner surface of column wall 10 or which may penetrate into the bed itself as shown in the drawing.

Nozzle 13 is coupled to a liquid feed line 15 by means of a coupling 16 which, in contrast to prior art practice, is placed away from the bed and within a casing 17 which terminates in an end member 18. This end member closes the opening in the housing and the nozzle passes through it to extend into the bed. The casing in turn is tightly fitted into a sleeve 19 which is sealed to or integral with column wall 10.

Although the coupling 16 is capable at ambient temperature it forming a leaktight fit between nozzle 13 and feed line 15, when these components are assembled the leaktight fit may be affected by the temperature of the bed during operation. However, by placing the afterend of the nozzle, the coupling and a portion of the feed line in casing 17, any liquid feed droplets 20 which leak out around the coupling drop into the casing, drain out and are removed from the spacing 21 defined between the casing 17 and the liquid feed line 15. The casing may or left open to permit free drainage of liquid therefrom, or it may be closed by an end plate 22 as illustrated in the drawing. When the nozzle assembly 13 is extending into the bed, as shown in the drawing, it may be necessary to purge the space 21 with a stream of a suitable liquid, e.g., water, which will prevent the feed liquid in feed line 15 from overheating and will also prevent the drying and caking of any feed liquid that may have leaked into space 21. Means for introducing such a liquid is illustrated as a wash liquid delivery line 23 extending into the upper portion of space 21 and being connected to a wash liquid source not shown. Normally, the wash liquid will fill a major portion of cavity 21 and be drained off through one or more ports 24 in end plate 22.

If desired, a pressurized fluid, e.g., compressed air may be introduced through line 25 to form a pressure seal between the outer wall of casing 17 and the inner wall of sleeve 19 in order to prevent escape of the fluidizing gases from the bed. However, it has been found that in many cases, such gas losses were relatively small and that such a pressure seal was not necessary.

The use of the apparatus of this invention prevents any leaking from the nozzle onto the bed particles and makes it possible to maintain a steady stream of feed liquid, which may contain finely divided solid particles suspended therein, through the nozzle into the hot fluidized bed. These factors in turn make it possible to maintain a steady spray cone of uniform-sized particles and to prevent any unwanted solids buildup on the bed particles. The drying rate of the liquid feed particles is a function of liquid feed particle size; and the physical and chemical properties of the fluidized bed product are in many cases directly dependent upon this drying rate. It therefore becomes apparent that uniform liquid particle size of the feed liquid is essential to the attainment of uniform chemical and physical properties. This interdependence of drying rate and uniform properties throughout the product material is particularly important in the formation of composite materials (e.g., a composite of iron and aluminum oxides) formed by the method disclosed in U.S. Pat. No. 3,305,349. In this method the uniformity in chemical and physical products depends upon drying rate which in turn depends upon the size of the liquid feed droplets which are formed of a solution of salts of the metals used to form the composite materials.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. An improved liquid feeding apparatus for introducing a feed liquid into a fluidized bed, comprising in combination
    a. a nozzle adapted to spray liquid into a fluidized bed;
    b. a liquid feed line;
    c. coupling means adapted to join said nozzle to said liquid feed line;
    d. casing means surrounding and defining around said feed line and said coupling an annular spacing adapted to collect liquid leakage, said casing means terminating in an end member through which said nozzle extends into said fluidized bed; and
    e. sleeve means affixed to the housing wall of said bed, said sleeve forming a tight fit around said casing means.

2. A liquid feeding apparatus in accordance with claim 1 including means to deliver a pressurized fluid to any void volumes defined between said casing means and said sleeve thereby to form a pressure seal.

3. A liquid feeding apparatus in accordance with claim 1 wherein said casing means is closed and means are provided to introduce a wash liquid into and withdraw it from said casing.